(12) United States Patent  
Wall et al.

(10) Patent No.: US 12,547,211 B2
(45) Date of Patent: Feb. 10, 2026

(54) ARRANGEMENT FOR A FLEXIBLE, PLANAR COMPONENT

(71) Applicant: AUDI AG, Ingolstadt (DE)

(72) Inventors: Christian Wall, Hitzhofen (DE); Jens Schirmer, Dresden (DE); Johannes Herold, Dresden (DE)

(73) Assignee: AUDI AG, Ingolstadt (DE)

( * ) Notice: Subject to any disclaimer, the term of this patent is extended or adjusted under 35 U.S.C. 154(b) by 665 days.

(21) Appl. No.: 17/764,277

(22) PCT Filed: Oct. 26, 2020

(86) PCT No.: PCT/EP2020/080024
§ 371 (c)(1),
(2) Date: Mar. 28, 2022

(87) PCT Pub. No.: WO2021/099066
PCT Pub. Date: May 7, 2021

(65) Prior Publication Data
US 2022/0332173 A1    Oct. 20, 2022

(30) Foreign Application Priority Data
Nov. 21, 2019  (DE) .......................... 10 2019 131 505

(51) Int. Cl.
*G06F 1/16*      (2006.01)
*H04M 1/02*   (2006.01)

(52) U.S. Cl.
CPC ........ *G06F 1/1652* (2013.01); *H04M 1/0268* (2013.01)

(58) Field of Classification Search
CPC ..... G06F 1/1652; B60J 1/2091; B60J 1/2088; H05K 1/118
See application file for complete search history.

(56) References Cited

U.S. PATENT DOCUMENTS 10,019,036 B2 *   7/2018   Sun .................. G06F 1/1652
11,170,671 B1 *  11/2021   Han .................... G09F 9/301
(Continued)

FOREIGN PATENT DOCUMENTS

CN         101329036 A        12/2008
CN         108602460 A         9/2018
(Continued)

OTHER PUBLICATIONS

Examination Report issued on Jul. 27, 2020, in corresponding German Application No. 102019131505.0, 8 pages.
(Continued)

*Primary Examiner* — Sagar Shrestha
(74) *Attorney, Agent, or Firm* — Maier & Maier, PLLC

(57) ABSTRACT

The problem relates to an arrangement for a flexible flat component which comprises a front side and a rear side, wherein the arrangement comprises a flat stabilization element and lamellas, wherein the lamellas are arranged on the rear side of the component, wherein the component can be deformed, wherein the stabilization element is designed to cooperate with the lamellas on the rear side of the component and to fix the component in a shape that the respective component is respectively currently in.

12 Claims, 1 Drawing Sheet

(56) References Cited

U.S. PATENT DOCUMENTS

| | | | |
|---|---|---|---|
| 2013/0032299 A1* | 2/2013 | Bratcher | F02D 45/00 |
| | | | 160/84.01 |
| 2013/0038584 A1* | 2/2013 | Burgin | G09F 21/04 |
| | | | 40/446 |
| 2013/0058063 A1 | 3/2013 | O'Brien | |
| 2014/0210577 A1 | 7/2014 | Peng et al. | |
| 2015/0055287 A1 | 2/2015 | Seo | |
| 2015/0089974 A1* | 4/2015 | Seo | A44C 5/0076 |
| | | | 63/1.13 |
| 2015/0325804 A1* | 11/2015 | Lindblad | H10K 50/80 |
| | | | 313/511 |
| 2016/0100478 A1 | 4/2016 | Lee | |
| 2016/0155965 A1* | 6/2016 | Kusuura | H10K 71/50 |
| | | | 29/829 |
| 2017/0156225 A1* | 6/2017 | Heo | G09F 9/301 |
| 2018/0070466 A1* | 3/2018 | Kim | G09F 9/301 |
| 2018/0070467 A1 | 3/2018 | Kim et al. | |
| 2018/0295735 A1* | 10/2018 | Ahn | G06F 1/1641 |
| 2019/0064881 A1* | 2/2019 | Kim | G06F 1/1652 |
| 2019/0172377 A1* | 6/2019 | Kim | G06F 1/1652 |
| 2019/0204874 A1* | 7/2019 | Kim | G09F 9/301 |
| 2019/0297736 A1 | 9/2019 | Xu et al. | |
| 2020/0043386 A1* | 2/2020 | Kim | G09F 9/301 |
| 2022/0253104 A1* | 8/2022 | Luo | G06F 1/1652 |
| 2023/0389200 A1* | 11/2023 | Du | G06F 1/1652 |

FOREIGN PATENT DOCUMENTS

| | | |
|---|---|---|
| CN | 109147571 A | 1/2019 |
| DE | 2621534 A1 | 11/1976 |
| DE | 102005054697 A1 | 5/2007 |
| DE | 102006042595 A1 | 3/2008 |
| DE | 102005054697 B4 | 9/2012 |
| DE | 102018116380 A1 | 2/2019 |
| EP | 2947643 B1 | 2/2018 |
| WO | 2014200466 A1 | 12/2014 |
| WO | 2016083850 A2 | 6/2016 |

OTHER PUBLICATIONS

International Preliminary Report on Patentability issued on May 17, 2022, in corresponding International Application No. PCT/EP2020/080024, 29 pages.

Office Action issued on Apr. 26, 2024, in corresponding European Application No. 20800050.5, 10 pages.

Office Action issued on Dec. 23, 2024, in corresponding Chinese Application No. 202080079743.6, 28 pages.

* cited by examiner

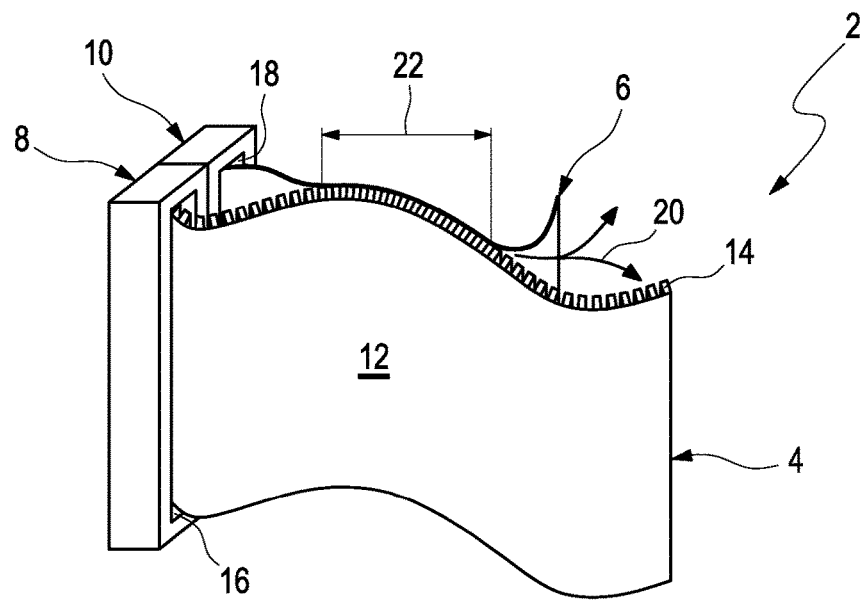
Fig. 1
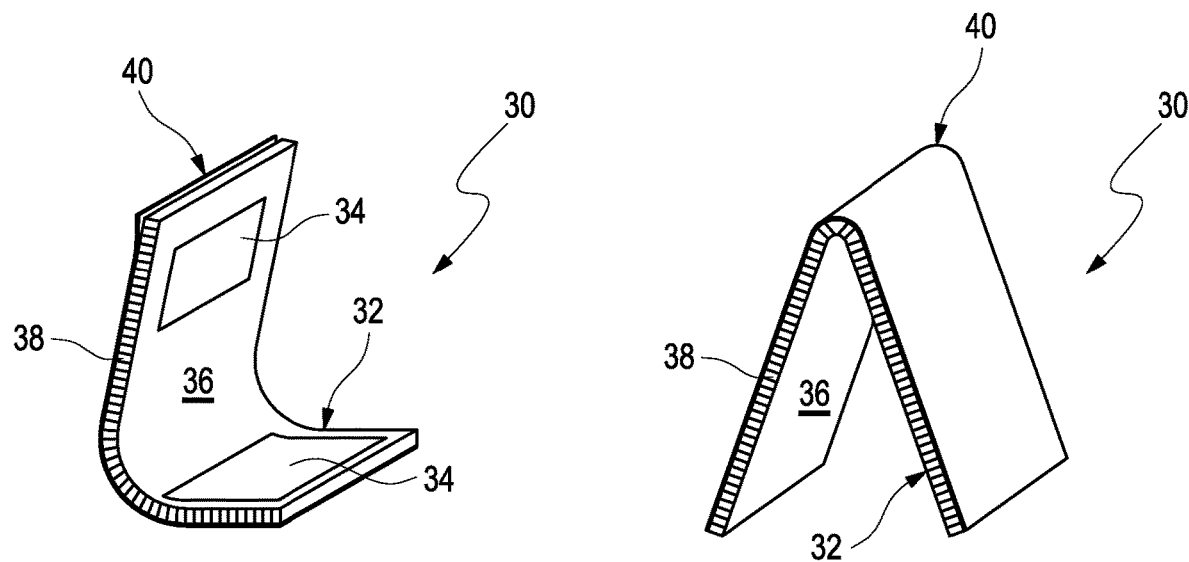
Fig. 2 a
Fig. 2 b

ARRANGEMENT FOR A FLEXIBLE, PLANAR COMPONENT

FIELD

The invention relates to an arrangement for a component.

BACKGROUND

A flexible component can be easily deformed. However, auxiliary means are necessary to fix such a flexible component in an intended shape.

Published document DE 26 21 534 A1 describes a heat- and sound-absorbing plate and the production thereof.

A display device is described in published document DE 10 2006 042 595 A1.

From published document U.S. Pat. No. 2,014,210 577 A1, a method and a component for securing and deforming a flexible device is known.

On this background, suitably securing a flexible component was a problem.

SUMMARY

The arrangement according to the invention is designed for a flexible flat component which comprises a front side and a rear side. The arrangement comprises a flat stabilization element and lamellas. The lamellas are arranged on the rear side of a flexible component. The component is elastically deformable. The stabilization element is designed to cooperate with the lamellas on the rear side of the component and to fix and/or stabilize the component in a shape that the component is respectively currently in.

The stabilization element, which is flat in design and which is designed or to be referred to as layer, is designed on one side of two sides to cooperate with the lamellas, wherein the lamellas on the rear side of the component are to be connected or are connectable in a force-transmitting and/or in a friction-locked manner on the rear side of the component to the layer and thus to the stabilization element. Here, it is provided that the layer and thus the stabilization element and at least one lamella of the component can be secured, are to be secured and/or are secured to one another by a reversible force-transmitting connection and thus can be detached again and can be fastened, are to be fastened and/or are fastened temporarily to one another.

The stabilization element as structural part is designed for example as thin layer which can be connected or is to be connected or is connected via a force-transmitting method to the lamellas.

In terms of design, the lamellas on the rear side of the component are or will be connected to the layer in a force-transmitting manner. Here, a change in length of the rear side is avoided, wherein the component is denied any possibility of bending and as a result it is stiffened.

It is provided here that the layer enters into friction-locked but not positive-locked connection with the lamellas. The stabilization element or the layer can be designed such that it is unstructured and/or film-like. Due to the cooperation of the lamellas with the layer, a bending behavior of the component is influenced; the layer is designed here to prevent or avoid a change in length of the rear side of the component.

As type of connection, any method can be used which connects the lamellas to the usually thin layer in a force-transmitting manner and/or in a friction-locked manner. Here, it is possible to connect the lamellas to the layer temporarily and in such a manner that they can be detached again. Here, it is possible to reversibly connect the lamellas and the layer in a force-transmitting or friction-locked manner using a suitable adhesive on the lamellas and/or on the layer, wherein it is possible to design such a connection such that it is reversible. Moreover, it is possible that, between the lamellas and the layer, via an electrostatic force of attraction or a magnetic force of attraction, a reversible force-transmitting or friction-locked connection is provided, wherein the lamellas and/or the layer accordingly comprise or comprises electrostatically and/or magnetically acting elements for providing a respective force of attraction.

The arrangement comprises a first cartridge for receiving the component and a second cartridge, separate from the first cartridge, for receiving the stabilization element. Here, the cartridges are arranged next to one another and are as a rule fastened to one another.

The component can be received in the first cartridge at least partially, optionally completely, or is to be received therein at least partially, optionally completely, wherein the component can be pulled at least partially, optionally completely, or is to be pulled at least partially, optionally completely, out of the first cartridge. In addition, the stabilization element can be received in the second cartridge at least partially, optionally completely, in the second cartridge, or is to be received therein at least partially, optionally completely, wherein the stabilization element can be pulled at least partially, optionally completely, or is to be pulled at least partially, optionally completely, out of the second cartridge. The stabilization element is designed to fix the component in the currently intended shape if the component is at least partially arranged outside of the first cartridge and the stabilization element is at least partially arranged outside of the second cartridge. For this purpose, lamellas on the rear side of the component are to be connected or can be connected to the stabilization element in a friction-locked manner.

The arrangement is provided for a component which comprises a flexible, thin-layered display field or display on the front side or on its front side.

The component is provided for a vehicle and can be arranged, for example, in an interior of the vehicle.

Depending on the definition, the arrangement can comprise the flat flexible component.

If the component comprises the display field, it can also be designed as laptop or tablet, wherein the component is and/or will be stabilized by the stabilization element.

It is also possible that the component is designed as sunshield and is and/or will be stabilized by the stabilization element.

The arrangement enables the flat and flexible component to be stiffened and fixed in any shape.

The thin, flat component can, in terms of design, be formed, for example, as film, usually made of a plastic or else of sheeting, usually made of metal. Here, this thin flat component can be bent in multiple directions due to its small thickness. By providing the arrangement, it is possible to widen the component by the rear side or by the lamellas applied to the rear side. Thereby, the component is influenced in such a manner that an unrolling and rolling up of the component along an orientation of the lamellas in one direction is possible.

The stabilization element can additionally be designed and/or referred to as thin layer. In an embodiment of the arrangement, the lamellas on the rear side of the component are supplemented by the stabilization element designed as thin layer, wherein this additional layer and thus the stabilization element is connected by a force-transmitting method to the lamellas on the rear side of the component, wherein, due to a securing of the stabilization element on the lamellas of the component, a deformation of the component, for example, an unrolling or a rolling up of the component, is avoided, since it is fixed in an intended shape by means of the stabilization element. Here, an entire structure of the component can be maintained in its respective current or present shape by the stabilization element.

In a possible application, by means of the component, a sunshield for a vehicle or in a vehicle, which can be designed as motor vehicle or car, can be implemented. Here, the component and thus the sunshield can be rolled up when not in use and stored in the first cartridge. In order to provide the sunshield by means of the component, a user can pull the flexible component out of the first cartridge to a certain length and position it such that it blocks the sun in an optimal manner for the user. Such an optimal orientation is fixed in the form of the current shape or structure of the component via the stabilization element which, as layer, is pulled out of the separate second cartridge and is connected via the lamellas in a force-transmitting and/or friction-locked manner to the flexible component which is also designed as layer. According to an additional application possibility, the component is designed as display field or display which comprises at least one flexible display element, as a rule multiple flexible display elements, on the front side of the component. In this case as well, the component provided with the display field can be pulled out of the first cartridge as far as desired and thus to any length and positioned by the user. Moreover, the component is maintained and/or fixed in the intended shape by applying the stabilizing stabilization element as rear-side layer or rear layer on the rear side of the component, which is provided with the lamellas.

Such a display field or display module and the arrangement can also be provided for a vehicle and installed, for example, in its interior. However, it is also possible to use the component and the arrangement as a stand-alone product. Here, it is possible, for example, that the component with the display field assumes the form of a tablet or a conventional laptop, depending on how it is maintained and/or fixed by the stabilization element.

It is understood that the aforementioned features and those to be explained below can be used not only in the respective indicated combination but also in other combinations or alone without exceeding the scope of the present invention.

BRIEF DESCRIPTION OF THE DRAWINGS

The invention is represented based on embodiments diagrammatically in the drawings and described diagrammatically and in detail in reference to the drawings.

FIG. 1 shows a first embodiment of the arrangement according to the invention in a diagrammatic representation.

FIG. 2 shows a second embodiment of the arrangement according to the invention in a diagrammatic representation.

The figures are described in an interrelated and comprehensive manner. Identical reference numerals are associated with identical components.

DETAILED DESCRIPTION

The first embodiment of the arrangement 2, diagrammatically represented in FIG. 1, includes a flexibly deformable flat component 4 and a flat stabilization element 6 which is here also designed such that it is flexible and deformable. In addition, the arrangement 2 includes a first cartridge 8 for temporarily receiving the component 4, and a second cartridge 10 arranged immediately next to it for temporarily receiving the stabilization element 6. In FIG. 1, a front side 12 of the component 4 can be seen. On the opposite rear side of the component 4 facing away from said front side, a plurality of lamellas 14 are arranged and/or fastened.

In a position of non-use, the component 4 is arranged in the first cartridge 8 and the stabilization element 6 is arranged in the second cartridge 10. Here, it is possible, for example, for both the component 4 and the stabilization element 6 for the component 4 to be rolled up in a respective cartridge 8, 10. In order to transfer the component 4 into an intended position of use, the component is pulled out of the first cartridge 8, here out of a slot 16 in a housing of the first cartridge 8. In addition, the stabilization element is also pulled out of the second cartridge 10, here out of a slot 18 in a housing of the second cartridge 10.

In FIG. 1, a branched arrow 20 indicates that the stabilization element 6, pulled out of the second cartridge 10, can be positioned relative to the component 4. Moreover, in FIG. 1, using a double arrow 22, a flat region is indicated, along which the stabilization element 6 rests on the lamellas 14 on the rear side of the component 4, wherein the stabilization element 6, along a two-dimensional surface, is in contact with the lamellas 14 on the rear side of the component 4. For this purpose, one side of the stabilization element 6, which here faces the rear side of the component 4, is designed to cooperate with the lamellas 14 on the rear side of the component 4, wherein the component 4 and the stabilization element 6 are in contact with each other in the region 22, wherein the lamellas 14 on the rear side of the component 4 and the stabilization element 6 are temporarily and detachably connected in a friction-locked or force-transmitting manner, wherein the component 4 is stiffened in this region 22 by the stabilization element 6. Depending on the definition, it is possible that the component 4 and the stabilization element 6 stiffen one another. The component 4 is here provided as sunshield for an interior of a vehicle.

The second embodiment of the arrangement 30 according to the invention is represented in FIGS. 2a and 2b from different perspectives. This arrangement 30 as well includes a flexible flat component 32 with a front side which is designed here at the same time as display or display field, wherein the display field here comprises multiple display elements 34. For the provision of the display field and thus of the display elements 34, the component 32, on its front side, comprises an optically active layer made of light emitting diodes, for example. In addition, the component 32 comprises, on its rear side facing away from the front side 36 with the display elements 34, a plurality of lamellas 38. Arranged on the lamellas 38 is a flat flexible stabilization element 40 which cooperates with the lamellas 38 on the rear side of the component 32. Here, the lamellas 38 are temporarily connected to the stabilization element 40, and in such a manner that they can be detached again, in a force-transmitting and/or friction-locked manner. Due to such a reversible connection, the component 32 and the stabilization element 40 which is designed here as layer are fixed in the shapes shown in FIGS. 2a and 2b. For this purpose, it is provided that the component 32 and the stabilization element 40 are designed here such that they are rectangular and largely have the same area. In a possible design, the lamellas 38 and/or the stabilization element 40 designed as layer comprise/comprises adhesive, by means of which a force-transmitting or friction-locked connection is provided between the lamellas 38 and the stabilization element 40.

Here, for the layer or the stabilization element 6, 40, it is possible to use adhesive which is designed in such a manner that a reversible adhesive effect is achieved thereby. Here, a complete curing of the adhesive or glue, as is the case, for example, with an epoxy-based adhesive system, is avoided for a long time. At the same time, an initial adhesive force of the adhesive used is scaled in such a manner that it is sufficient for the application-specific forces in a respective arrangement 2, 30. An adhesive effect necessary in this case can be referred or designed as "adhesive note effect." In terms of design, the stabilization element 6, 40 comprises an adhesive strip which is designed to enter into in a reversible or detachable force-transmitting connection with the lamellas 14, 38.

Alternatively, as additional measures for the force-transmitting, reversible connection between the lamellas 14, 38 and the stabilization element 6, 40, magnetic or electrostatic forces of attraction can also be used.

LIST OF REFERENCE NUMERALS

2 Arrangement
4 Component
6 Stabilization element
8, 10 Cartridge
12 Front side
14 Lamella
16, 18 Slot
20 Arrow
22 Double arrow
30 Arrangement
32 Component
34 Display element
36 Front side
38 Lamella
40 Stabilization element

The invention claimed is:

1. An arrangement for securing a flexible flat component, comprising: the flexible flat component, the flexible flat component having a front side and a rear side, the flexible flat component further having a plurality of lamellas arranged on the rear side thereof; and
   a flat stabilization element separate from the flexible flat component and configured to removably couple to the rear side of the flexible flat component;
   wherein the flexible flat component is deformable and is adjustable in shape in a configuration in which the flexible fat component has been at least partially arranged outside of a housing of the flexible flat component and in which the flat stabilization element is not coupled to the rear side of the flexible flat component,
   wherein the flat stabilization element is configured to, after the flexible flat component has been at least partially extended outside of the housing of the flexible flat component and adjusted into a particular shape, fix the flexible flat component in the particular shape that the flexible flat component is respectively currently in when the flat stabilization element is coupled to the rear side of the flexible flat component;
   a first cartridge for receiving the flexible flat component and a second cartridge for receiving the stabilization element; and
   wherein the flexible flat component can be at least partially received in the first cartridge, wherein the flexible flat component can be at least partially pulled out of the first cartridge, and wherein the stabilization element can be at least partially received in the second cartridge, wherein the stabilization element can be at least partially pulled out of the second cartridge, and wherein the stabilization element is designed to fix the flexible flat component in the shape when the flexible flat component is at least partially arranged outside of the first cartridge and the stabilization element is at least partially arranged outside of the second cartridge.

2. The arrangement according to claim 1, wherein the stabilization element as layer is designed to connect to the lamellas of the flexible flat component in a force-transmitting manner.

3. The arrangement according to claim 1, wherein the flexible flat component comprises a display field on its front side.

4. The arrangement according to claim 1, wherein the flexible flat component is provided for a vehicle.

5. The arrangement according to claim 1, wherein the flexible flat component is designed as a laptop.

6. The arrangement according to claim 1, wherein the flexible flat component is designed as a sunshield.

7. The arrangement according to claim 2, wherein the flexible flat component comprises a display field on its front side.

8. The arrangement according to claim 1, wherein the flexible flat comprises a display field on its front side.

9. The arrangement according to claim 1, wherein the flexible flat component comprises a display field on its front side.

10. The arrangement according to claim 2, wherein the flexible flat component is provided for a vehicle.

11. The arrangement according to claim 1, wherein the flexible flat component is provided for a vehicle.

12. The arrangement according to claim 3, wherein the flexible flat component is provided for a vehicle.

* * * * *